United States Patent [19]

Overs

[11] Patent Number: 4,534,307

[45] Date of Patent: Aug. 13, 1985

[54] ADAPTER FOR INSTALLATION OF MARINE INSTRUMENTS

[76] Inventor: Ronald R. Overs, 96 Fox Hunt La., E. Amherst, N.Y. 14051

[21] Appl. No.: 540,042

[22] Filed: Oct. 7, 1983

[51] Int. Cl.³ .............................................. G01C 21/00
[52] U.S. Cl. .................................... 114/343; 114/197; 440/112; 73/186
[58] Field of Search .................... 114/197, 183 R, 343; 440/112; 73/186, 187, 500, 181; 277/112, 168, 170, 171, 177, 190; 285/161, 192, 200; 411/368, 531, 544

[56] References Cited

U.S. PATENT DOCUMENTS

| | | | |
|---|---|---|---|
| 1,082,324 | 12/1913 | Hart | 277/170 |
| 3,482,444 | 12/1969 | Jefferson | 73/186 |
| 3,531,988 | 2/1969 | Casani | 73/187 |
| 3,643,506 | 2/1972 | Miles | 73/186 |
| 4,079,626 | 3/1978 | Gardner | 73/181 |
| 4,280,390 | 7/1981 | Murray | 411/544 |

Primary Examiner—Trygve M. Blix
Assistant Examiner—C. T. Bartz
Attorney, Agent, or Firm—Michael L. Dunn; William H. Holt

[57] ABSTRACT

An adapter assembly for surface mounting of marine instruments and the like through a constant diameter opening in a marine vessel surface and the like; including a cylindrical mount housing having a tapered annular end; an adapter member having a central frusto-conical opening; an enlarged diameter inwardly tapered end; and an opposite end having a reduced diameter flat annular surface and an outwardly tapered annular surface joining the extremity of the inwardly tapered end.

2 Claims, 5 Drawing Figures

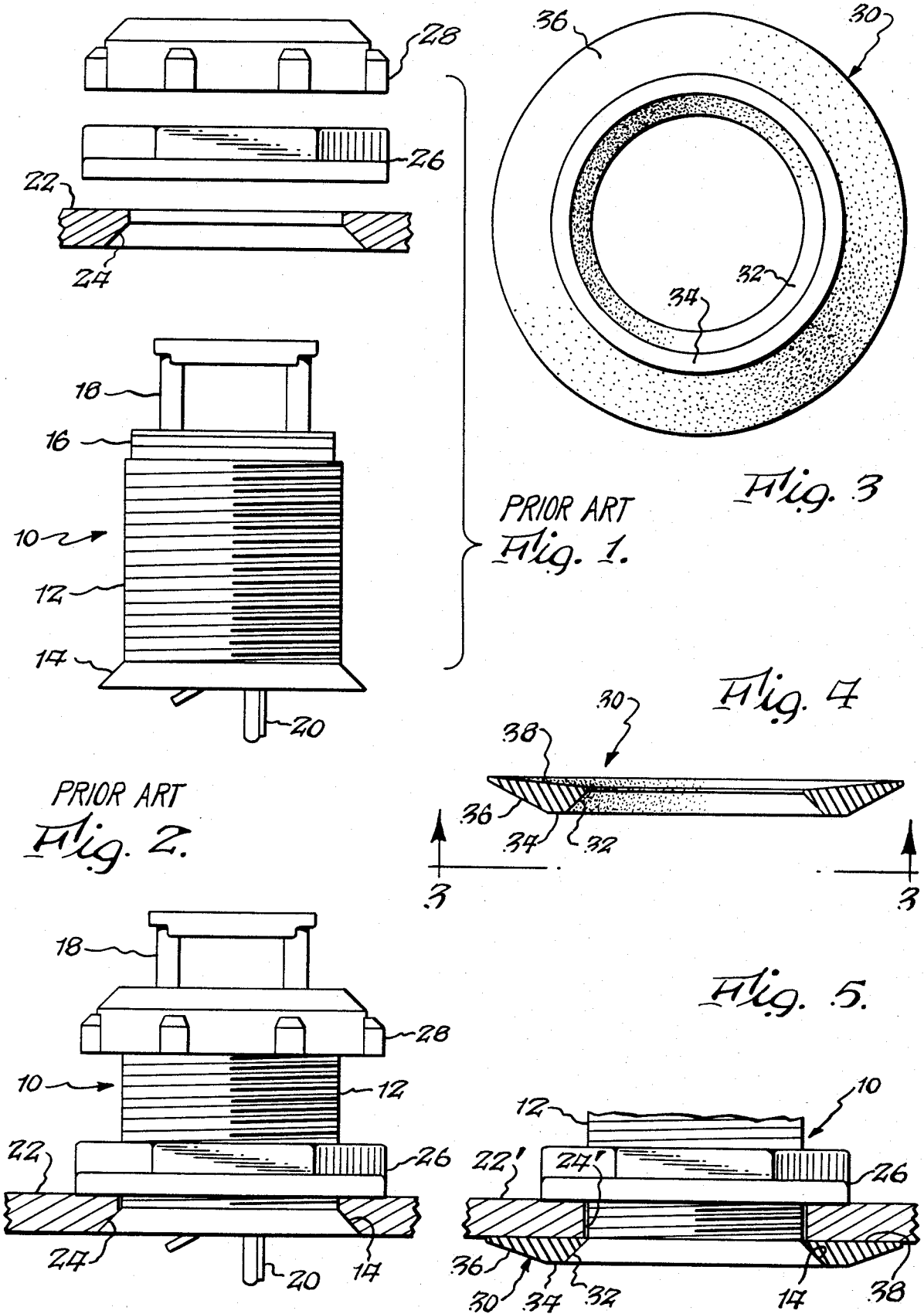

ADAPTER FOR INSTALLATION OF MARINE INSTRUMENTS

BACKGROUND OF THE INVENTION

The present invention relates to marine instruments and, more particularly, to an adapter to permit such instruments to be surface-mounted to the marine vessel.

Typically, marine instruments such as knotmeters or the like include sensing structure that must be suitably mounted to the hull, or other surface, of the vessel and exposed to the water for actuation thereby. One type of installation includes a mount housing into which is secured the sensing unit. The end of the housing adjacent the hull is suitably tapered or beveled to coact with a correspondingly tapered or countersunk opening through the hull such that the housing may be secured to the hull substantially flush with the exterior surface thereof. This type of flush-mount installation requires not only drilling a simple bore in the hull but countersinking the opening as well. Oftentimes, the vessel must be dry-docked to perform the necessary operations to surfaces which are normally below the waterline.

SUMMARY OF THE INVENTION

In accordance with the teachings of the present invention, the installation of marine instruments to the underwater surfaces of the vessel is greatly simplified and may be quickly performed without the necessity of dry-docking the vessel.

An adapter is provided which enables the mount housing to be securely and quickly installed though a constant diameter opening in the vessel such that the same, and the marine instrument housed therewithin, is mounted to the surface of the vessel. The adapter is, preferably, of annular, dish-shaped construction having a central tapered or frusto-conical opening, the taper of which corresponds to and is complementary with a tapered end of the mount housing whereby, after installation, the water exposed end of the mount housing is substantially flush with the exposed surface of the adapter.

Essentially, then, the present invention provides a surface mount adapter assembly for mounting marine instruments to the underwater surfaces of marine vessels, comprising; a generally cylindrical mount housing having an outwardly tapered end; the housing having a hollow interior for the reception of a marine instrument; an adapter member having a central substantially frusto-conical opening complementary to said outwardly tapered end for mating engagement therewith; one end of said adapter member having an enlarged diameter surface for engagement with the outer surface of a marine vessel; and means for securing said mount housing and said adapter to the surface of the marine vessel such that said mount housing passes through a substantially constant diameter opening therein and the other end of said adapter is substantially flush with the tapered end of said mount housing.

Other characterizing features and advantages of the present invention will become readily apparent from the ensuing description thereof.

BRIEF DESCRIPTION OF THE DRAWINGS

For a fuller understanding of the present invention reference should now be made to the following detailed description thereof taken in conjunction with the accompanying drawings, wherein:

FIG. 1 is an exploded view of the structure for mounting a marine instrument flush with the surface of a marine vessel;

FIG. 2 is similar to FIG. 1, but showing the components in assembled condition;

FIG. 3 is a view, taken substantially along view lines 3—3 of FIG. 4, of the surface-mount adapter of the present invention;

FIG. 4 is cross-sectional view of the adapter shown in FIG. 3; and

FIG. 5 is a partial fragmentary view, similar to FIG. 2, depicting the adapter and mount housing affixed to the marine vessel.

DETAILED DESCRIPTION OF THE PREFERRED EMBODIMENT

Referring in detail to the drawings, FIGS. 1 and 2 show a typical flush-mount installation of a marine instrument to the underwater surface of a marine vessel. More specifically, a mount housing, generally depicted at 10, is of generally cylindrical, hollow construction; having an externally threaded body 12 and an outwardly, tapered or beveled annular end 14. A marine instrument sending or sensing assembly 16 is received interiorly of mount housing 10. As shown, assembly 16 is externally threaded and includes, in the case of a knotmeter (illustratively depicted) a handle 18 and a water responsive paddle wheel 20. It is to be understood that the knotmeter is shown for illustrative purposes only. Any type of instrument may be received within mount housing 10. The marine vessel surface or hull 22 is countersunk at 24 to receive the mount housing 10 therethrough with the tapered end 14 mating with the tapered annular wall of the countersink. Suitable means, in the form of nut 26, is provided to secure housing body 12 to the vessel. When nut 26 is tightened about body 12, end 14 is drawn into intimate contact with the countersink opening 24 such that same is substantially flush with the vessel outer surface 22. A nut or the like 28 is provided to secure the sensing assembly 16 to the mount housing 10.

It should be understood that the procedure for countersinking the vessel surface or hull 22 is much more time consuming and complicated than providing a simple, straight, constant diameter opening therethrough. This is especially true for those users that attempt installation while the vessel is still in the water. In which case, time is of the essence to minimize the quantity of water being admitted through the opening until the installation is completed.

In accordance with the present invention, an adapter is provided to enable the mount housing and the marine instrument to be quickly and easily surface mounted to the vessel through a straight, constant diameter through opening.

As shown in FIGS. 3-5, the adapter, generally depicted at 30, is of generally dish-shaped construction having a substantially frusto-conical or tapered central opening 32; and a reduced diameter annular flat end surface 34 terminating in an annular, outwardly tapered lip surface 36 that joins an enlarged diameter, annular, inwardly tapered opposite end surface 38. The adapter may be fabricated of any suitable resilient material so as to conform to any slight irregularities in the vessel surface.

In FIG. 5, the vessel surface or hull is depicted at 22' and is provided with a constant diameter through opening 24'. Adapter 30 is located between surface 22' and mount housing body 12 such that frusto-conical opening 32 is adjacent to tapered end 14 for mating engagement therewith. Under the pressure of nut 26, the enlarged diameter end 38 of adapter 30 is flexed into intimate contact with the vessel surface 22'. It should be understood that the taper of opening 32 and the extent thereof is complementary to that of body end 14 such that, after assembly, the flat surface 34 is substantially flush therewith. Further, the tapered surface 36 provides smooth or relatively streamlined continuity between the mount housing 10 and the vessel surface 22'.

It should be clear from the foregoing description that the adapter quickly and easily converts a typical flush mount assembly, which normally requires a countersunk opening through the hull, into a surface mount assembly requiring only a straight, constant diameter opening therethrough.

Although a preferred embodiment of the present invention has been disclosed and described, changes will obviously occur to those skilled in the art. For example, although the adapter has been described as applicable to marine vessels, it would be obvious to employ the same in any environment wherein it is desirable to convert a flush mount to a surface mount installation. It is also quite obvious than any type of instrument could be housed within the mount housing. It is, therefore, intended that the present invention is to be limited only by the scope of the appended claims.

What is claimed is:

1. An adapter for converting flush mount installation of marine instruments and the like to surface mount installation, said adapter comprising:

an adapter member (30) consisting of a sealing washer fabricated of a resilient material and of generally dish-shaped construction including a central frusto-conical opening (32);

a first annular, generally smooth end surface (38) inclined inwardly from an outer edge to an inner edge contiguous with said opening (32) for forming a generally smooth concave profile;

a second annular, generally smooth end surface (34) disposed opposite from said first end surface (38) and being substantially flat from an outer edge to an inner edge;

an annular generally smooth inclined connecting surface (36) having an inner edge joined with the outer edge of said second annular end surface (34), and an outer edge joined with the outer edge of said first annular end surface (38);

said first annular end surface (38) and said annular connecting surface (36) converging outwardly of said adapter member (30) for forming a gradually tapered portion which decreases at a generally constant rate and has its apex at the outermost periphery of said adapter member (30).

2. The adapter member as defined in claim 1 in combination with a mount housing (10) for attaching a sensing assembly (16) to an underwater portion of a hull (22') of a marine vessel;

said mount housing (10) including a beveled end (14) for complementary mating engagement with said frusto-conical opening (32) and in planar alignment with said second annular, generally smooth and flat end surface (34);

said mount housing (10) being generally cylindrical for being received in a cylindrical opening (24') which extends completely through said hull (22');

and means (26) for securing said mount housing (10) and said adapter member (30) to said hull (22') with said first smooth end surface (38) being flexed from its generally smooth concave profile into flush engagement with said hull (22').

* * * * *